United States Patent [19]

Williams

[11] 4,275,753
[45] Jun. 30, 1981

[54] FUEL LINE CUT-OFF SWITCH

[76] Inventor: Robert J. Williams, 716, 12th St., Baraboo, Wis. 53913

[21] Appl. No.: 87,766

[22] Filed: Oct. 24, 1979

[51] Int. Cl.³ .............................................. F16K 17/36
[52] U.S. Cl. ........................................ 137/45; 137/38; 180/282
[58] Field of Search ...................... 137/38, 39, 43, 45; 180/282, 284

[56] References Cited

U.S. PATENT DOCUMENTS

| 1,852,558 | 4/1932 | Dunzweiler | 137/43 X |
| 2,324,999 | 7/1943 | Shinn | 137/43 X |
| 3,957,072 | 5/1976 | Ellsworth | 137/38 |

Primary Examiner—Robert G. Nilson
Attorney, Agent, or Firm—Craig and Antonelli

[57] ABSTRACT

A fuel cut-off switch is disclosed which comprises a collapsible fuel line for conveying fuel when the switch is in a first position and a device for collapsing the collapsible fuel line along at least a portion thereof to cut off fuel flow therethrough when the switch is tilted a predetermined amount from the first position. The collapsible fuel line may be in the form of a cut-off finger of rubber or plastic which is suspended for movement relative to the device for collapsing the flexible rubber finger, the latter may take the form of a ring surrounding the collapsible fuel line. A weight is attached to the collapsible fuel line for pulling it under force of gravity against the ring to collapse the finger and cut-off fuel flow therethrough.

14 Claims, 6 Drawing Figures

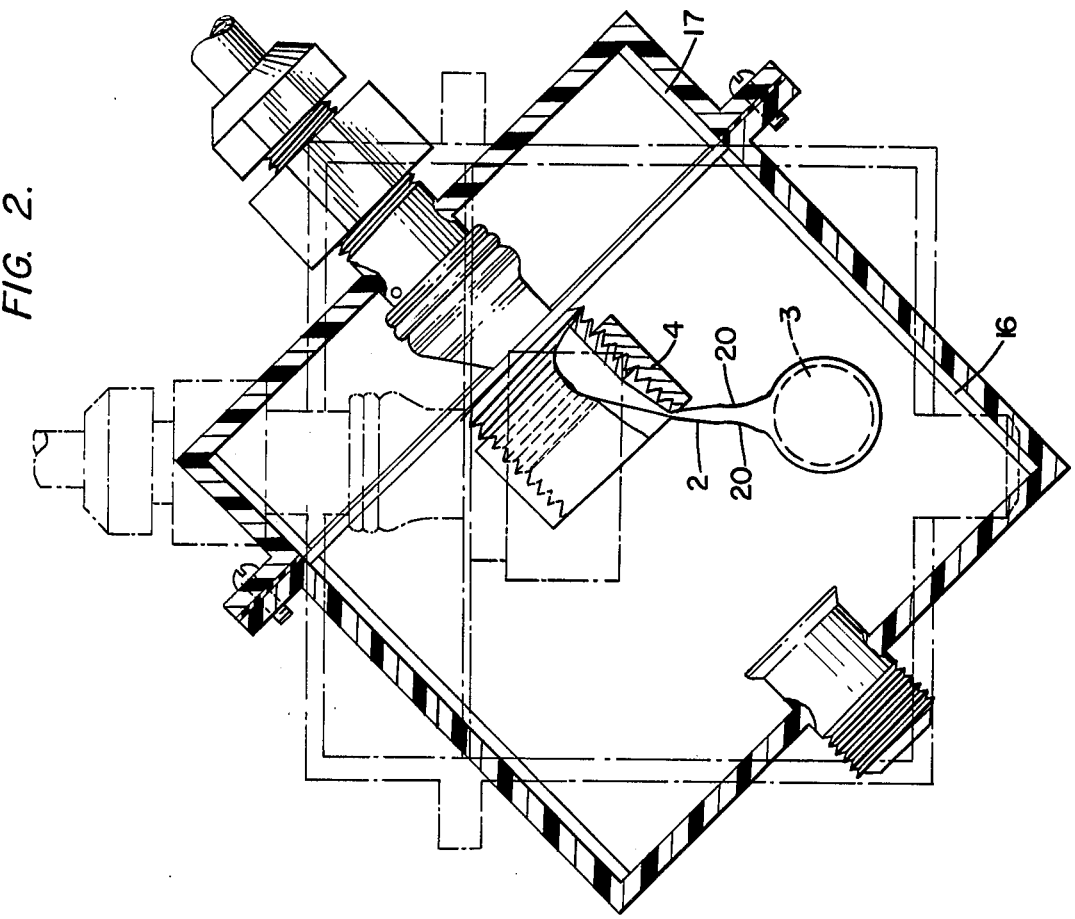
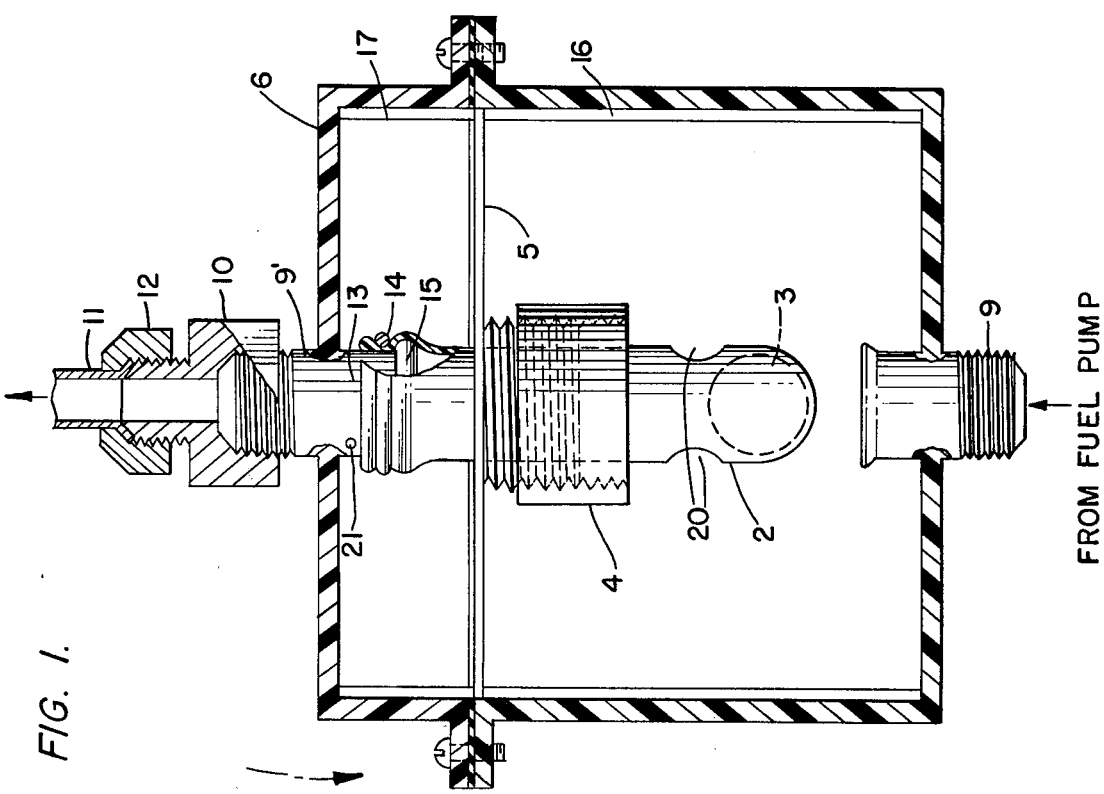

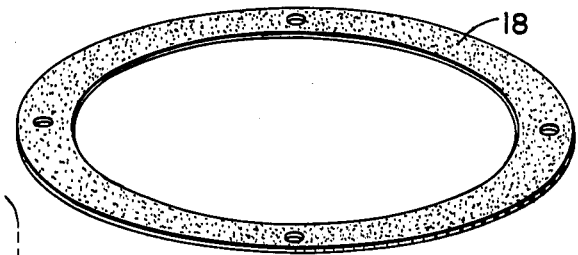
FIG. 4.
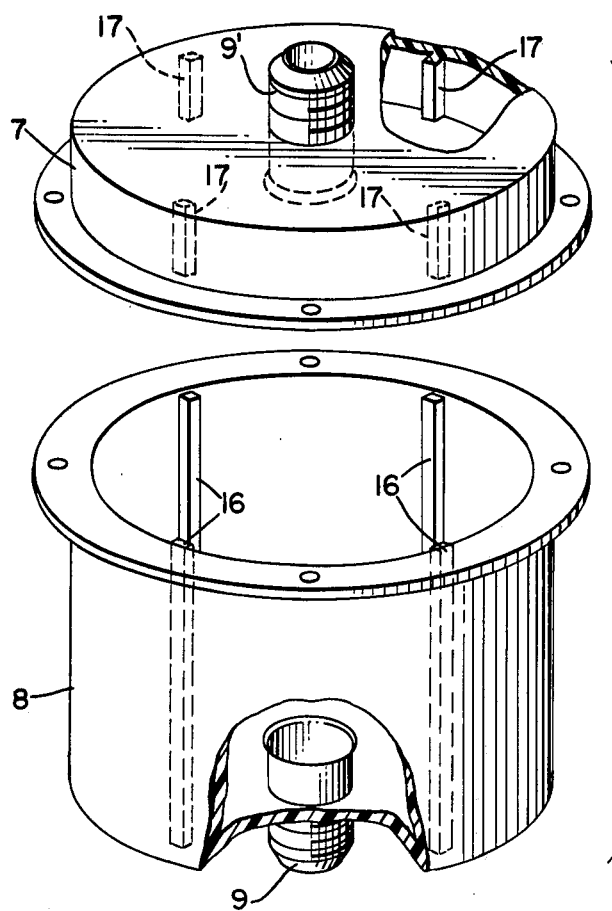
FIG. 3.
FIG. 5.
FIG. 6.
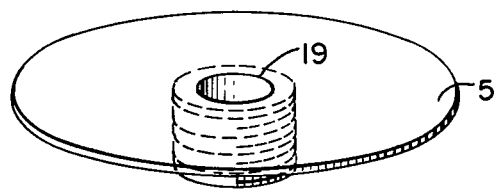

FUEL LINE CUT-OFF SWITCH

BACKGROUND AND SUMMARY OF THE INVENTION

The present invention relates to a fuel cut-off switch for cutting off the flow of fuel when the switch is tilted a predetermined amount from a first position.

Fuel cut-off switches are useful in motor vehicles, for example, such as tractors, caterpillars, trucks or cars to cut off the flow of fuel to the engine when the vehicle (and switch) becomes dangerously tilted or has tipped over.

Several devices for interrupting fuel flow are known. However, these known devices are disadvantageous in that, for example, they must be mounted in the fuel tanks of the vehicles which presents problems of accessibility for repair or installation in existing vehicles; they do not automatically reset themselves after cutting off the fuel flow once the vehicle is returned to its normal operating position; they operate on inertia and only when a jolt or collision occurs and then only in a specific direction or directions; they have to be installed above the carburetor and fuel tank in order to operate; and/or they do not provide means for the adjustment of the angle of tilt for cut-off.

Therefore, it is an object of the present invention to provide a fuel cut-off switch which is both simple and economical, which can be quickly and easily installed in new or existing vehicles, which is readily accessible for checking or repair, which automatically resets itself when the vehicle has been righted, which operates to shut off fuel flow when the vehicle (and the switch) is tipped in any direction, which can be placed and operated between the fuel pump and carburetor in a motor vehicle and which permits an adjustment of the tilt angle which will result in cut-off of the fuel flow.

Each year thousands of tractors tip over injuring or killing the tractor operator. Such accidents may be due to operating tractors on hillsides, hitching a heavy load too high or getting stuck in the mud. In these cases the tractor rears backward, front up, and tips onto the tractor operator. A further hazard occurs if the tractor turns over on its side while in gear. In this latter situation, if the tractor continues to run, the tractor chassis will pivot around the rear wheel thereby presenting a serious hazard to the tractor operator. Roll bars are now frequently installed on tractors to reduce the risks to the operator from such accidents. However, the roll bars are not totally effective in preventing injuries and deaths and the cost for installing them is considerable.

Thus, a further object of the present invention is to provide a fuel cut-off switch for cutting off the flow of fuel to the engine in certain slow moving vehicles, such as tractors and caterpillars, when these vehicles become dangerously tilted or are operating too close to the angle at which they will tip over, which fuel cut-off switch can be installed in a new or used vehicle at relatively low cost.

An additional object of the present invention is to provide a fuel cut-off switch for shutting off the engine of an overturned vehicle to thereby minimize fires. In particular, it is an object of the present invention to provide a fuel cut-off switch which cuts off the fuel supply to the carburetor of an overturned vehicle to shut off the engine and thereby prevent gas from leaking out of the carburetor and being ignited by hot engine parts such as the manifold.

The aforementioned and other objects of the present invention are attained by providing a fuel cut-off switch comprising collapsible fuel line means for conveying fuel when said switch is in a first position and means for collapsing said collapsible fuel line means along at least a portion thereof to cut off fuel flow therethrough once the switch is tilted a predetermined amount from said first position.

In one form of the present invention the collapsible fuel line means is suspended for movement relative to the means for collapsing and a weight is attached thereto for pulling the collapsible fuel line means against the means for collapsing to collapse the fuel line means when the cut-off switch is tilted a predetermined amount from the first position. The collapsible fuel line means may take the form of a cut-off finger which is suspended in a housing and which has a weight attached to a lower portion of the finger for pulling the finger against the means for collapsing to collapse the finger when the cut-off switch is tilted a predetermined amount from the first position.

The means for collapsing the collapsible fuel line means is, according to a disclosed embodiment of the present invention, a ring which surrounds the suspended collapsible fuel line means. Means may be provided for adjusting the position of the ring and thereby the predetermined amount of tilting required for effecting cut-off of fuel flow.

The fuel cut-off switch of the present invention is advantageously connected in the fuel line of a motor vehicle between the fuel pump and a carburetor thus making it unnecessary for any other attachment mechanism.

These and other objects, features and advantages of the present invention will become more apparent from the following description when taken in connection with the accompanying drawings, which show, for purposes of illustration only, a single embodiment in accordance with the present invention.

BRIEF DESCRIPTION OF THE DRAWINGS

FIG. 1 is a side view, partially in cross-section, of a cut-off switch according to the present invention.

FIG. 2 is a side elevational view, partially in cross-section, showing the fuel cut-off switch in a tilted position where fuel flow is cut off and in dashed lines the normal upright or vertical position.

FIG. 3 is an elevational view of the upper and lower housing members of the fuel cut-off switch of FIG. 1.

FIG. 4 is a side elevational view of a gasket for sealing between the upper and lower housing members of FIG. 3.

FIG. 5 is a side elevational view of the adjustor ring shown in FIGS. 1 and 2.

FIG. 6 is a side elevational view of the diaphragm shown in FIGS. 1 and 2.

DETAILED DESCRIPTION OF THE DRAWINGS

The fuel cut-off switch 1 depicted in FIG. 1 comprises a collapsible fuel line in the form of a rubber cut-off finger 2 which is suspended in a housing 6 connected in the fuel line of a motor vehicle between a fuel pump and a carburetor. Fuel inlet and outlet fittings 9 and 9', respectively, are provided on the housing 6 for connection by suitable means to the fuel line 11. One such connection, that between the fuel outlet 9' and the fuel line 11, is shown in FIG. 1 where it is seen that the fuel line 11 is flared and connected by a suitable threaded fastener 12 to a male fitting 10, which, in turn, is attached to the threaded connecT)Mj 9' provided on the housing 6. A like or other type connection to the fuel line can be made at the fuel inlet 9. In this illustrated embodiment the housing 6 is formed of molded plastic and the threaded fittings 9 and 9' are integrally molded therewith. It is also envisioned that the housing 6 and associated fittings 9 could be formed of other materials such as suitable metals and need not be integrally formed.

The fuel cut-off switch housing 6 shown in FIG. 1 is connected in a vertical portion of the fuel line 11 so that in the normal or upright position of the cut-off switch, and vehicle, the cut-off finger 2 is suspended within the housing from a lower tubular extension 13 of the fuel outlet 9' which extends inwardly from the top of the housing. The extension 13 has an enlarged end or lip 15 over which the top of the cut-off finger 2 is retained by a suitable connector ring 14 or other appropriate fastener.

A weight in the form of a metal ball 3 is provided in the pocket-like portion at the lower end of the cut-off finger 2 so that the force of gravity will pull the cut-off finger against an adjustor ring 4 for collapsing the cut-off finger when the cut-off switch is tilted a predetermined amount from the upright position as shown in FIG. 2.

In the upright or normal operating position of the cut-off switch the cut-off finger serves as a fuel line in that fuel enters the cut-off finger 2 through fuel inlet holes 20 provided in a lower portion of the finger, the fuel then passing up through the cut-off finger and out the upper end or outlet thereof. However, when the cut-off switch is tilted a predetermined amount from the upright position the cut-off finger is collapsed at a position intermediate the holes 20 and the upper end or outlet so that fuel flow therethrough is interrupted.

The cut-off finger 2 is formed from rubber or suitable plastics which are compatible with the fuel used in the vehicle and which should be tough and moderately pliable to minimize pendulum or oscillating motion during normal operation of the vehicle yet pliable enough to fold and collapse due to the action of gravity weight of the metal ball or weight when the cut-off switch is tilted as shown in FIG. 2.

The size of the cut-off finger is preferably such that the inside diameter is at least equal to or larger than the inside diameter of the fuel line so that it will not obstruct the normal flow of fuel to the carburetor. The specific thickness of the material for the finger will depend on the characteristics of the material itself as well as the desired stiffness and collapsibility of the finger as will readily be apparent to the skilled artisan. The inlet holes 20 of the finger should preferably have a total area larger than that of the fuel line of the vehicle. In addition, the weight and size of the ball or other shaped weight should be matched with the finger material to bring about the desired stiffness and collapsibility. Generally speaking, it is preferred to make the ball slightly larger than the inside diameter of the finger so that when inserted therein it fits tightly enough so as not to fall out of the pocket-like portion at the lower end of the finger. With such an arrangement the ball also assists in holding the collapsible finger open in the area of the inlet holes 20. Materials for the housing of the switch as well as those for the cut-off finger should be chemically compatible with the type of fuel and should also be heat-resistant so as to withstand the high temperatures generated by the engine. Suitable materials for the housing include lexon, polyethylene or similar plastics. The housing could also be made from metal.

The adjustor ring 4 is screwed onto a depending portion of a diaphragm 5 supported in a housing 6. The housing 6 includes upper and lower housing members 7 and 8 which are provided with ribs 16 and 17, respectively, between which the diaphragm 5 is supported. The diaphragm 5 has a hole in the center thereof through which the cut-off finger is suspended. The angle of cut-off can be adjusted by turning the adjustor ring 4 on the threaded depending portion of the diaphragm 5. That is, as the adjustor ring 4 moves upwardly on the diaphragm, as shown in FIG. 1, the greater the tilt is that is required for fuel angle cut-off, e.g., approximately 45° or more. The diaphragm and angle adjustor may be made of an inexpensive, rigid type of plastic. The upper and lower housing members 7 and 8 are removably connected together by suitable fasteners. A gasket 18 is positioned between the upper and lower housing members 7 and 8 for effectively sealing the housing when the housing members are connected together.

In assembling the cut-off switch shown in FIG. 1 a metal ball or weight 3 is inserted into the cut-off finger 2 and the cut-off finger is pulled over the lip 15 of the fuel outlet extension 13. The connector ring 14 is used to secure the cut-off finger on the fuel outlet. Next, the adjustor ring 4 is screwed onto the diaphragm 5 and the resulting assembly is then set into the lower housing member 8. The ribs 16 inside the housing support the diaphragm from the bottom. The upper housing member 7 with its attached finger assembly is then put on the top of the gasket 18 and lower housing 7, the lower portion of the finger assembly passing through the central hole of the diaphragm 5. Holes on the housing members 7 and 8 are aligned and suitable fasteners such as screws are inserted and tightened. The ribs 17 of the upper housing loosely hold the diaphragm 5 in position from above.

The assembled cut-off switch is then connected in a vertical portion of the fuel line of a vehicle, appropriate connections being made to the fuel inlet 9 and fuel outlet 9' as previously discussed. The switch can be installed on new or used vehicles, in a factory or garage and at low cost.

Once the cut-off switch is installed the engine starter system is engaged to fill the switch to the desired level. The fuel level will be slightly above the finger inlet holes or, if it is desired to fill the cut-off switch fuller, a small air hole can be provided in the fuel outlet or the upper part of the finger as hole 21 shown in FIG. 1.

The operation of the fuel cut-off switch will now be described. First, when the vehicle (and switch) operates in an upright or vertical position fuel is pumped successively through the lower housing inlet 9, the switch housing 6, the fuel inlet holes 20 of the cut-off finger, the fuel outlet 9' and then into the carburetor. However, when the vehicle (and cut-off switch) is tipped approximately 45° or more, the gravity force of the metal ball or weight at the end of the finger pulls the finger against the lower edge of the adjustor ring 4 collapsing the cut-off finger so that fuel flow to the carburetor is cut off.

The present invention is both simple and economical and can be applied to any combustion engine vehicle whether it is fueled by liquid or gaseous fuel. For example, the present invention could be employed in slower moving vehicles such as riding mowers, golf carts, tractors, earth moving equipment, boats, etc., to cut off fuel flow to the engine when the vehicles become dangerously tilted and thereby prevent such vehicles from tipping over. It is also understood that the present invention is applicable to any type of heater which can be tipped over. The present invention is also useful in all types of vehicles, especially fast moving vehicles such as cars and trucks, to shut off the fuel supply to the carburetor when the vehicle turns over on its side or top thereby minimizing danger of fire damage to vehicles or vehicle occupants who may be unconscious or trapped in the vehicle. A further advantageous feature of the present invention is that once the vehicle has been righted, the fuel cut-off switch of the present invention is automatically reset so as to permit fuel flow therethrough.

It is also contemplated that a hand operated pet cock could be installed at the bottom of the housing of the illustrated fuel cut-off switch to drain fuel if repairs were necessary. Further, it is envisioned that a mechanism could be provided to adjust the angle of cut-off from the outside, eliminating the need to dismantle the switch for adjustment. Additionally, with respect to the disclosed embodiment of the present invention, it is noted that the design of the fuel cut-off switch is such that it acts as a sediment bowl in the fuel line which removes sediment and water from the fuel supply.

It is also understood that the collapsible fuel line of the present invention need not be in the form of a finger as in the above-described embodiment but could be merely a collapsible tube with appropriate, spaced fuel inlet and outlet openings. A weight in the form of a ring, rather than a ball, could be attached about the lower end of such a tube if it were suspended for movement as in the disclosed embodiment. Alternatively, it is envisioned that such a tube could be fixed or supported at each end and that the means for collapsing the tube with a predetermined tilt could be provided for movement relative to the tube upon tilting. It is also envisioned that the means for collapsing the fuel line in the disclosed embodiment could have a configuration other than a ring as will be readily apparent to the skilled artisan.

While in the illustrated embodiment of the present invention the fuel cut-off switch is connected in the fuel line of a motor vehicle between a fuel pump and a carburetor, the present invention may also be used in gravity feed fuel systems in which case the cut-off switch is located between the fuel tank and the carburetor.

Thus, while I have shown and described only a single embodiment in accordance with the present invention, it is understood that the same is not limited thereto but is susceptible of numerous changes and modifications as would be known to those skilled in the art, given the present disclosure, I therefore do not wish to be limited to the details shown and described herein but intend to cover all such changes and modifications as are encompassed by the scope of the appended claims.

I claim:

1. A fuel cut-off switch comprising collapsible fuel line means for conveying fuel when said switch is in a first position and means for collapsing said collapsible fuel line means along at least a portion thereof to cut off fuel flow therethrough when said switch is tilted a predetermined amount from said first position, said means for collapsing being supported independently of said collapsible fuel line means.

2. The fuel cut-off switch according to claim 1, wherein one of said collapsible fuel line means and said means for collapsing said collapsible fuel line means is suspended for movement relative to the other with tilting of said fuel cut-off switch for effecting collapse of said collapsible fuel line means to cut off fuel flow therethrough.

3. A fuel cut-off switch comprising collapsible fuel line means for conveying fuel when said switch is in a first position and means for collapsing said collapsible fuel line means along at least a portion thereof to cut off fuel flow therethrough when said switch is tilted a predetermined amount from said first position, wherein one of said collapsible fuel line means and said means for collapsing said collapsible fuel line means is suspended for movement relative to the other with tilting of said fuel cut-off switch for effecting collapse of said collapsible fuel line means to cut off fuel flow therethrough, and wherein said collapsible fuel line means is suspended for movement relative to said means for collapsing and a weight is carried thereby for pulling said collapsible fuel line means against the means for collapsing to collapse the fuel line means when the cut-off switch is tilted a predetermined amount from said first position.

4. The fuel cut-off switch according to claim 3, wherein said means for collapsing is a ring which surrounds the suspended collapsible fuel line means.

5. The fuel cut-off switch according to claim 4, wherein means are provided for adjusting the position of the ring and thereby the predetermined amount of tilting required for effecting cut-off of fuel flow.

6. A fuel cut-off switch comprising collapsible fuel line means for conveying fuel when said switch is in a first position and means for collapsing said collapsible fuel line means along at least a portion thereof to cut off fuel flow therethrough when said switch is tilted a predetermined amount from said first position, and wherein a housing is provided about said collapsible fuel line means and said means for collapsing, said housing having a fuel inlet means and a fuel outlet means in fluid communication through the collapsible fuel line means.

7. The fuel cut-off switch according to claim 6, wherein said means for collapsing is supported within said housing on a diaphragm.

8. A fuel cut-off switch comprising collapsible fuel line means for conveying fuel when said switch is in a first position and means for collapsing said collapsible fuel line means along at least a portion thereof to cut off fuel flow therethrough when said switch is tilted a predetermined amount from said first position, wherein one of said collapsible fuel line means and said means for collapsing said collapsible fuel line means is suspended for movement relative to the other with tilting of said fuel cut-off switch for effecting collapse of said collapsible fuel line means to cut off fuel flow therethrough, and wherein a housing is provided about said collapsible fuel line means and said means for collapsing, said housing having a fuel inlet means and a fuel outlet means in fluid communication through the collapsible fuel line means.

9. The fuel cut-off switch according to claim 8, wherein said collapsible fuel line means is suspended from said fuel outlet means of the housing for movement relative to said means for collapsing, said collapsible fuel line means being in the form of a flexible cut-off finger having at least one fuel inlet hole in a lower portion thereof.

10. The fuel cut-off switch according to claim 9, wherein said flexible cut-off finger is made of rubber or plastic.

11. The fuel cut-off switch according to claim 10, wherein a weight is carried by said cut-off finger in a lower portion thereof for pulling the finger gainst the means for collapsing to collapse the finger at a position above said at least one fuel inlet hole when the cut-off switch is tilted a predetermined amount from said first position.

12. The fuel cut-off switch according to claim 11, wherein the weight is a metal ball.

13. The fuel cut-off switch according to claim 1, 2, 3 or 8, wherein the fuel cut-off switch is connected in the fuel line of a motor vehicle between a fuel pump and a carburetor.

14. The fuel cut-off switch according to claim 1, 2, 3 or 8, wherein the fuel cut-off switch is connected in the fuel line of a motor vehicle between a fuel tank and a carburetor.

* * * * *